US011279020B2

(12) United States Patent
Wang

(10) Patent No.: US 11,279,020 B2
(45) Date of Patent: Mar. 22, 2022

(54) PANEL WITH FIXTURE RETAINING FEATURES AND MODULAR ASSEMBLIES MADE USING MULTIPLE PANELS

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 266 days.

(21) Appl. No.: 16/663,665

(22) Filed: Oct. 25, 2019

(65) Prior Publication Data

US 2020/0055178 A1 Feb. 20, 2020

Related U.S. Application Data

(63) Continuation of application No. 15/290,681, filed on Oct. 11, 2016, now Pat. No. 10,507,571.

(51) Int. Cl.
*B23Q 3/00* (2006.01)
*B25H 1/08* (2006.01)

(52) U.S. Cl.
CPC .................................... *B25H 1/08* (2013.01)

(58) Field of Classification Search
CPC ...................................................... B25H 1/08
USPC ......................... 269/296, 297, 303, 315, 900
See application file for complete search history.

(56) References Cited

U.S. PATENT DOCUMENTS 1,026,475 A 5/1912 Tarbuck
1,793,560 A 2/1931 Schmieder
2,366,350 A 1/1945 Ostling
2,642,905 A 6/1953 Hewat
3,052,462 A 9/1962 Butler
3,575,405 A 4/1971 Harding
3,664,654 A 5/1972 Manville
3,697,046 A 10/1972 Sur
3,967,816 A 7/1976 Ramsperger
D248,728 S 8/1978 Elliott
4,170,345 A 10/1979 Townsend
4,445,678 A 5/1984 George
4,540,164 A 9/1985 Shade
4,555,099 A 11/1985 Hilton (Continued)

FOREIGN PATENT DOCUMENTS

DE 9200535 12/1993
FR 2580977 10/1986

(Continued)

OTHER PUBLICATIONS

"The Rockler T-Track Table Top", www.newwoodworker.com/reviews/rcklrttrktbletoprvu.html; Aug. 26, 2013.

(Continued)

*Primary Examiner* — Joseph J Hail
*Assistant Examiner* — Shantese L McDonald
(74) *Attorney, Agent, or Firm* — Wolter Van Dyke Davis, PLLC; Robert L. Wolter

(57) ABSTRACT

An apparatus, having: a panel (100) comprising a top surface (102), a bottom surface (104), and a side surface (106) spanning the top and bottom surfaces; plural upper retaining slots (110), each upper retaining slot recessed into the panel through the top surface, extending parallel to the top surface, and opening through the side surface in at least one location (112), wherein each upper retaining slot comprises a trapezoidal shape; and a dog hole (122) extending through the panel from the top surface to the bottom surface.

16 Claims, 16 Drawing Sheets

(56) References Cited

U.S. PATENT DOCUMENTS

| | | | | |
|---|---|---|---|---|
| 4,625,951 | A | 12/1986 | Yang | |
| 4,667,548 | A | 5/1987 | Astle et al. | |
| 4,669,227 | A | 6/1987 | Treppner | |
| 4,753,425 | A | 6/1988 | Yang | |
| 4,794,687 | A | 1/1989 | Peters | |
| 4,805,888 | A | 2/1989 | Bishop | |
| 4,861,011 | A | 8/1989 | Varga | |
| 4,867,427 | A | 9/1989 | Cunningham | |
| 4,962,918 | A | 10/1990 | Yang | |
| 5,009,134 | A | 4/1991 | Sorensen et al. | |
| 5,015,421 | A | 5/1991 | Messner | |
| 5,018,562 | A | 5/1991 | Adams | |
| 5,135,209 | A | 8/1992 | Penny | |
| 5,181,702 | A | 1/1993 | Pettigrew | |
| 5,190,271 | A | 3/1993 | Otterbein, II | |
| 5,305,992 | A | 4/1994 | Kish | |
| 5,405,124 | A | 4/1995 | Mayer | |
| 5,509,644 | A | 4/1996 | Engibarov | |
| D372,135 | S | 7/1996 | Lee et al. | |
| 5,730,434 | A | 3/1998 | Schoene | |
| 5,768,966 | A | 6/1998 | Duginske | |
| 5,862,718 | A | 1/1999 | Klesling | |
| 6,113,088 | A | 9/2000 | Gakhar | |
| 6,123,326 | A | 9/2000 | Kleinbongartz | |
| 6,244,582 | B1 | 6/2001 | Marcolina | |
| 6,451,070 | B1 | 9/2002 | Kent | |
| 6,453,643 | B1 | 9/2002 | Buscherini | |
| 6,474,901 | B1 * | 11/2002 | Thurston | F16B 12/50 403/381 |
| 6,505,391 | B1 | 1/2003 | Schneider | |
| 6,568,667 | B1 | 5/2003 | Hall | |
| 6,659,440 | B2 | 12/2003 | Levy | |
| 6,860,475 | B2 | 3/2005 | Wong | |
| 6,889,968 | B1 | 5/2005 | Wong | |
| 6,935,628 | B1 | 8/2005 | Conversa | |
| 7,000,519 | B1 | 2/2006 | Weinstein | |
| 7,040,609 | B1 | 5/2006 | Liou | |
| 7,114,714 | B2 | 10/2006 | Wong | |
| 7,415,912 | B2 | 8/2008 | Tyler | |
| 8,020,840 | B2 | 9/2011 | Hall, Jr. | |
| 8,220,374 | B2 | 7/2012 | Wang | |
| 8,454,259 | B2 * | 6/2013 | Oetlinger | E05D 5/0238 403/259 |
| 8,632,240 | B2 | 1/2014 | Tang | |
| 9,027,916 | B2 * | 5/2015 | Lin | B23Q 3/066 269/95 |
| 9,151,422 | B2 | 10/2015 | Kayacik | |
| 9,216,485 | B2 | 12/2015 | Huang | |
| 10,099,398 | B2 | 10/2018 | Wang | |
| D857,926 | S * | 8/2019 | Frank | B23Q 3/066 D25/119 |
| 2004/0245692 | A1 | 12/2004 | Brass | |
| 2006/0188325 | A1 * | 8/2006 | Dolan | F16B 12/125 403/205 |
| 2007/0132165 | A1 | 6/2007 | Hughes | |
| 2008/0084017 | A1 | 4/2008 | Barziza | |
| 2008/0127794 | A1 | 6/2008 | Jaksha | |
| 2011/0079127 | A1 | 4/2011 | Somogyl et al. | |

FOREIGN PATENT DOCUMENTS

| | | |
|---|---|---|
| GB | 2228705 | 9/1990 |
| GB | 2276114 | 9/1994 |
| GB | 2339402 | 7/1998 |
| WO | 1997043094 | 11/1997 |

OTHER PUBLICATIONS

Common Woodworking joints—RaygirlingWWJoints—Ray Girling—2005.
EHOMA; Groove Clamp Wood Handle, ehoma.tw, 2 pages.
Bessey Group; Bessey Simply Better; Track/Table clamp (GTR), Besseytools.com, 1 page.
https://www.pinterest.com/pin/299207968974955001/.
https://www.youtube.com/watch?v=KnNi6Tpp-ac&list=PLB1ATCukiUGRpTw3dlQFSk8uOmlEP3BJ1.
http://toolguyd.com/veritas-worksurface-with-dog-holes-t-tracks/.
http://www.woodcraftmagazine.com/posts.php?id=238.
https://www.ridgidforum.com/forum/power-tools/woodworking-discussion-forum/26135-t-track-versus-bench-dogs.

* cited by examiner

PANEL WITH FIXTURE RETAINING FEATURES AND MODULAR ASSEMBLIES MADE USING MULTIPLE PANELS

FIELD OF THE INVENTION

The invention relates to a modular panel used to provide additional work surfaces and having dog holes and retaining slots suitable for retaining work fixtures and modular assemblies composed of plural panels secured together.

BACKGROUND OF THE INVENTION

Woodworking enthusiasts and professionals often use wood boards as auxiliary work surfaces and/or sacrificial fences secured to an existing machine. Such auxiliary work surfaces/boards are typically configured to provide a flush and/or clear working surface.

Prior art work surfaces and auxiliary fences often include extruded metal (aluminum) members; however, these components are limited in size because of manufacturing cost and weight. In addition, the channels for receiving clamps extend in only one direction. That is, the extruded metal fences cannot be manufactured to include channels in multiple directions. More specifically, channels may be formed along edges of the board to receive a clamp post; however, the boards have a height dimension similar to that of the fence for the cutting tool and do not function well with larger wooden workpieces to be cut.

Alternatively, T-shaped grooves or channels have been formed on one side of the board to receive a T-shaped clamping post of a clamp, but the cross-sectional dimensions of these channels are not standardized, and the end users have difficulties in cutting the properly sized grooves to receive T-shaped clamping posts of a clamp.

Consequently, there remains room in the art for improvement.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

In describing particular features of different embodiments of the present invention, number references will be utilized in relation to the figures accompanying the specification. Similar or identical number references in different figures may be utilized to indicate similar or identical components among different embodiments of the present invention.

The present Inventor has devised an improved panel that includes various geometric features that are configured to secure tools to the panel. The geometric features include dog holes, and slots. The slots may be configured to receive and secure therein a post of a multi-purpose utility clamp such as the MATCHFIT™ clamp disclosed in U.S. Publication No. 2015/0343607 to Wang, which is incorporated herein in its entirety by reference. When used in conjunction with these tools, the panel may be used as a working surface, a fence, and/or be assembled together with connectors to additional panels to form any number of work assemblies.

Figure 1:
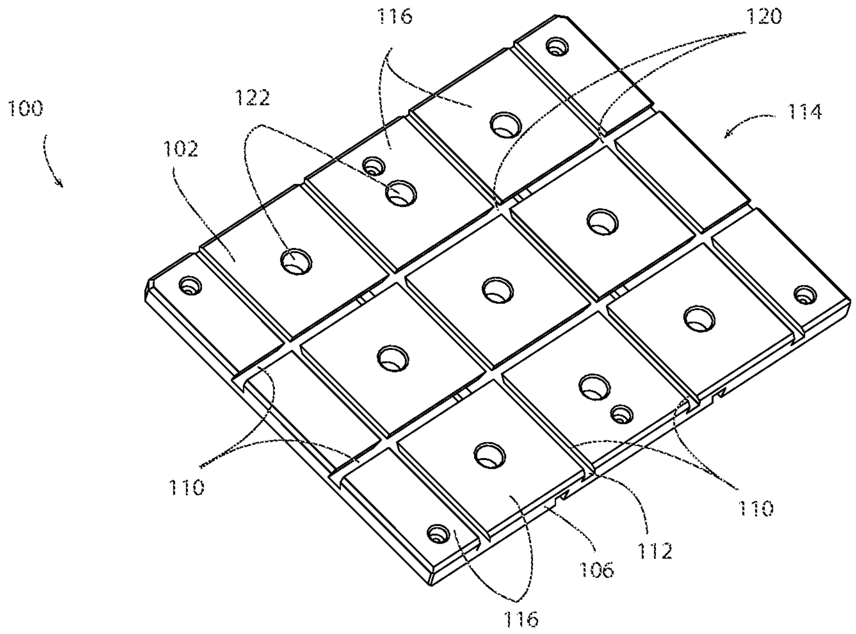
FIG. 1 is a view of an example embodiment of a panel disclosed herein from above.

FIG. 1 shows an example embodiment of a panel 100 having a top surface 102, a bottom surface 104 (not visible), and a side surface 106 spanning the top surface 102 and the bottom surface 104. The panel 100 is shown as being flat. Alternately, the panel may not be flat, but may occupy more than one plane, such as when having a "V-shape" etc. Plural upper retaining slots 110 are recessed into the panel 100 through the top surface 102. Each upper retaining slot 110 extends parallel to the top surface 102 and opens through the side surface 106 in at least one location 112 along the side surface 106.

Each upper retaining slot 110 takes a trapezoidal shape when viewed in cross section. As used herein, a trapezoid shape is a shape having only two parallel sides, (e.g. not including parallelograms), where the non-parallel sides of the trapezoidal shape are of equal length. An example of such a trapezoid is a dovetail. In an example embodiment, the dovetail shape is of suitable dimensions and angles to secure a second post of the MATCHFIT™ clamp.

The upper retaining slots 110 form a pattern 114 that divides the top surface 102 into discrete top surfaces 116. In an example embodiment the upper retaining slots 110 may form intersections 120 where two or more upper retaining slots 110 cross each other. The discrete top surfaces 116 may take any rectilinear shape, including triangles and quadrilaterals such as rectangles and squares etc. Rectangular shapes may have any aspect ratio when viewed from above.

In an example embodiment, the panel 100 includes a dog hole 122 extending through the panel from the top surface 102 to the bottom surface 104. In the example embodiment shown, there is a dog hole 122 through each discrete top surface 116. The dog holes 122 may or may not be centered in each discrete top surface 116, and there may be zero, one, or more than one dog hole 122 in each discrete top surface 116.

Although the embodiment shown depicts multiple retaining slots, the disclosure is intended to encompass embodiments of only a single retaining slot. In addition, the retaining slots need not intersect another retaining slot. Further, the retaining slots may be oriented in other directions, including diagonally etc. In an example embodiment the panel 100 is composed of wood. However, the panel 100 may be composed of any number of materials, including, for example, plastic.

Figure 2:
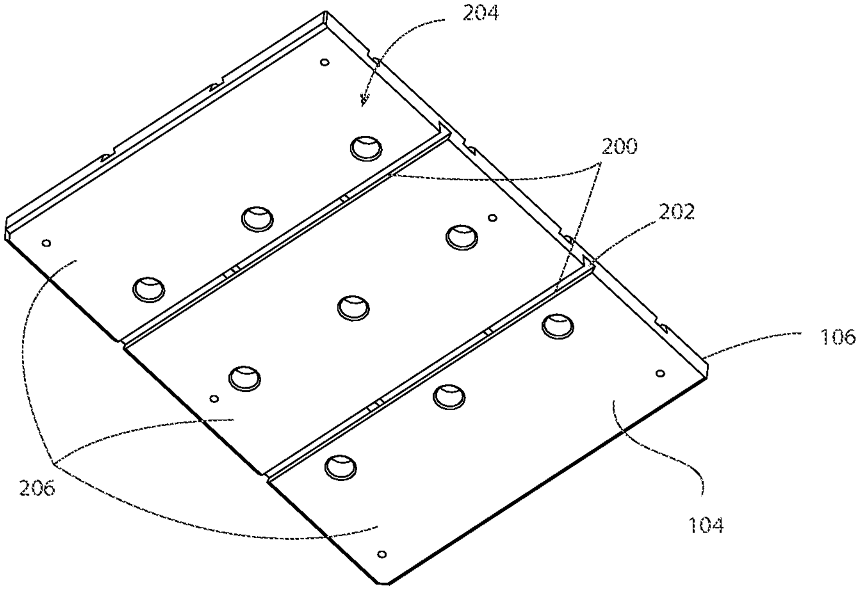
FIG. 2 is a view of the panel of FIG. 1 from below.

FIG. 2 shows the example embodiment of the panel 100 of FIG. 1, where the bottom surface 104 and the side surface 106 are visible. Plural bottom retaining slots 200 are recessed into the panel 100 through the top surface 102. Each bottom retaining slot 200 extends parallel to the bottom surface 104 and opens through the side surface 106 in at least one location 202. Each bottom retaining slot 200 takes a trapezoidal shape when viewed in cross section. In an example embodiment, the trapezoidal shape is the dovetail shape known to those of ordinary skill in the art. In an example embodiment, the dovetail shape is suitable to secure the second post of the MATCHFIT™ clamp.

The bottom retaining slots 200 form a pattern 204 that divides the bottom surface 104 into discrete bottom surfaces 206. In an example embodiment the bottom retaining slots 200 may form intersections (not shown) where two or more bottom retaining slots 200 cross each other. The discrete bottom surfaces 206 may take any rectilinear shape, including triangles and quadrilaterals such as rectangles and squares etc. Rectangular shapes may have any aspect ratio when viewed from below.

Figure 3:
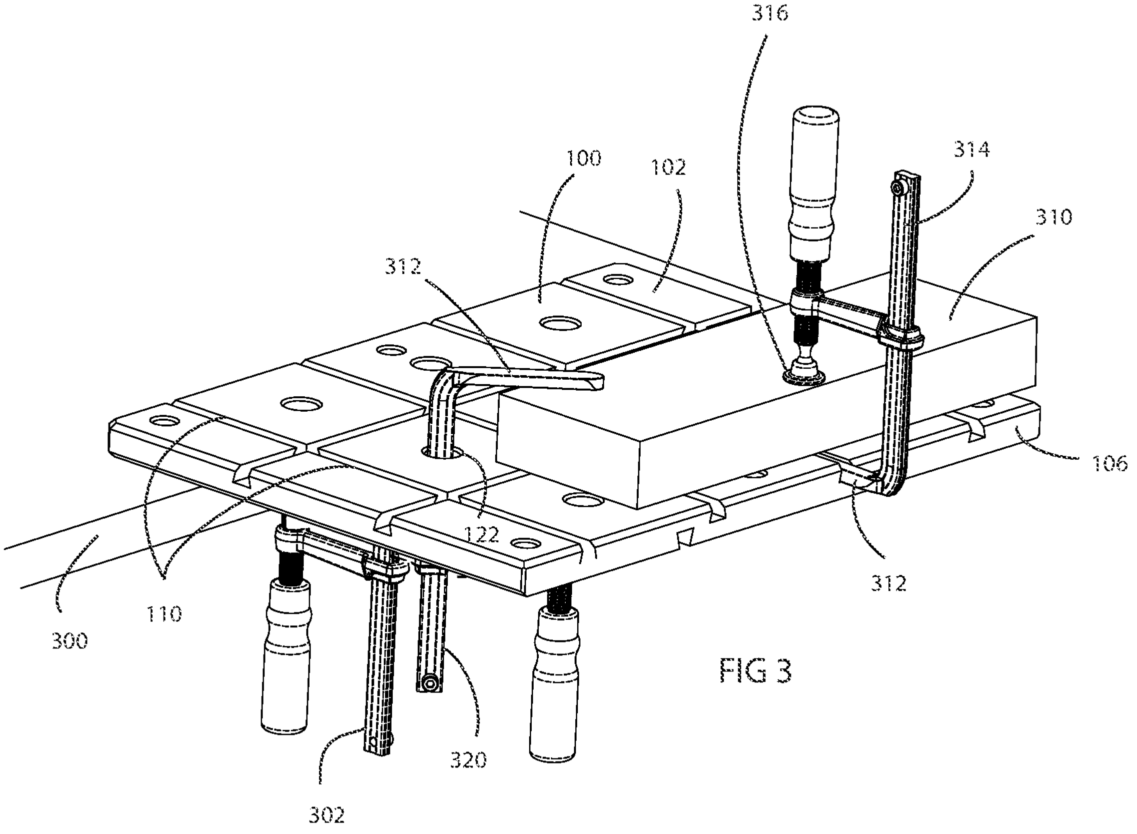
FIG. 3 shows the panel of FIG. 1 secured to a table.

FIG. 3 shows the panel 100 secured to a table top 300. The second post of a MATCHFIT™ clamp 302 has been inserted into a bottom retaining slot 200 in the panel 100. The table top 300 is inserted between a clamp head and the post of the MATCHFIT™ clamp 302 and the MATCHFIT™ clamp 302 is then clamped onto the table top 300. This, in turn, clamps the panel 100 to the table top 300. Additional MATCHFIT™ clamps 302 (not visible) may be used to secure the panel 100 to the table top 300. In this configuration, the panel 100 can therefore be used as an additional work surface that extends from the table top 300.

Two MATCHFIT™ clamps 302 are also shown securing a workpiece 310 to the panel 100. A second post 312 of one MATCHFIT™ clamp 314 has been inserted into an upper retaining slot 110. The workpiece 310 has been placed between the second post 312 and a clamp head 316 of the one MATCHFIT™ clamp 314 and the one MATCHFIT™ clamp 314 has been tightened to secure the workpiece 310 to the panel 100. In addition, a second post 312 of another MATCHFIT™ clamp 320 has been inserted through a dog hole 122 from the bottom to rest on top of the workpiece 310. A clamp head (not visible) of the other has been tightened to secure the workpiece 310 to the panel 100.

The dog hole 122 enables the MATCHFIT™ clamp 320 to be rotated a full 360 degrees and locked, providing great flexibility. In addition, this places a bulk of the MATCHFIT™ clamp 320 below the top surface 102, out of the way. However, when the workpiece 310 is removed, the clamp will likely drop away, and it takes two hands to secure the workpiece 310 in place, especially if the workpiece is on an inclined work surface or secured to a bottom of a horizontal panel. Further, the location of the dog holes 122 is fixed, and this sometimes puts the dog hole 122 too close or too far from the workpiece 310.

In contrast, the MATCHFIT™ clamp 320 can be moved to any desired position along a respective retaining slot. When the workpiece 310 is removed the MATCHFIT™ clamp 320 remains in place, regardless of the orientation (e.g. horizontal, inclined, overhead), of the respective retaining slot 110. This makes it easy to remove one workpiece 310 and replace it with another. Further, it takes only one hand to release the workpiece 310, and one hand to secure a new workpiece. Having both dog holes 122 and retaining slots 110 in each panel 100 allows an operator to take advantage of the benefits of both. This, in turn, obviates most disadvantages of either.

Figure 4:
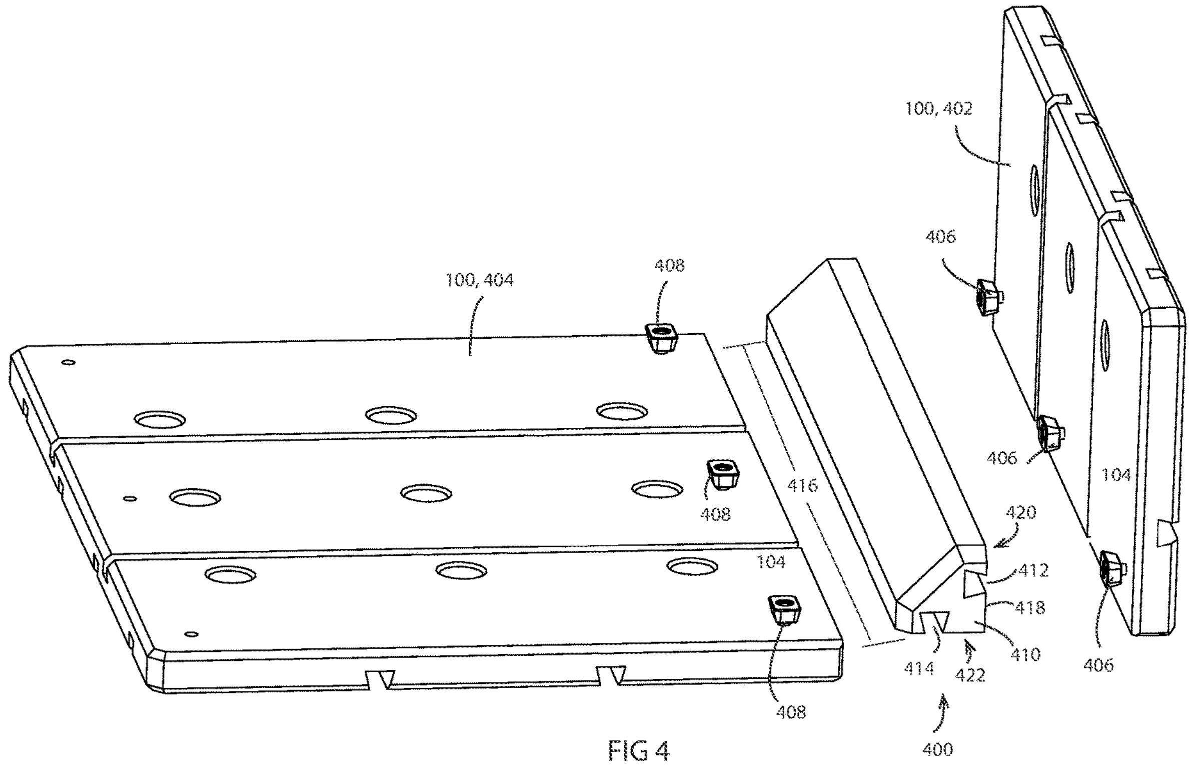
FIG. 4 shows two panels of the type shown in FIG. 1 and an example embodiment of a connection assembly that secures the two panels together.

FIG. 4 shows an example embodiment of a connector assembly 400 that is used to secure a first panel 402 to a second panel 404. The connector assembly 400 includes a first stud 406 that is secured to the first panel 402, a second stud 408 that secures to the second panel 404. An intermediate component 410 includes a first recess 412 that receives the first stud 406 and holds it in place in the intermediate component 410, and a second recess 414 that receives the second stud 408 and holds it in place in the intermediate component 410. In an example embodiment, the first recess 412 and the second recess 414 extend a full length 416 of the intermediate component 410 and open through end surfaces 418 of the intermediate component 410.

The studs 406, 408 and recesses 412, 414 may have any suitable geometry that interlocks the two together. In an example embodiment, the recesses 412, 414 include a trapezoidal shape when viewed in cross section. In an example embodiment the trapezoidal shape is a dovetail shape known to those of ordinary skill in the art. In an example embodiment, the dovetail shape is suitable to secure a second post of the MATCHFIT™ clamp. The studs 406, 408 may take a shape that is complementary to the shape of the recess and which secured the stud therein. The first recess 412 may receive one or more than one first studs 406. Similarly, the second recess 414 may receive one or more than one second studs 408. The studs 406, 408 may be secured to the respective panel 100 through any means known to those of ordinary skill in the art. For example, the studs 406, 408 may be bolted to the panel 100 via bolts (not visible, or secured to the panel 100 via adhesive.

The intermediate component 410 includes a first surface 420 that directly supports the bottom surface 104 of the first panel 402 when the first stud 406 is secured within the first recess 412, and a second surface 422 that directly supports the bottom surface 104 of the second panel 404 when the second stud 408 is secured within the second recess 414.

In an example embodiment the intermediate component 410 is composed of wood. However, the intermediate component 410 may be composed of any number of materials, including, for example, plastic or extruded aluminum. In an example embodiment, the studs 406, 408 are composed of plastic. However, the studs 406, 408 may be composed of any number of materials, including, for example, wood, or metal etc.

Figure 5:
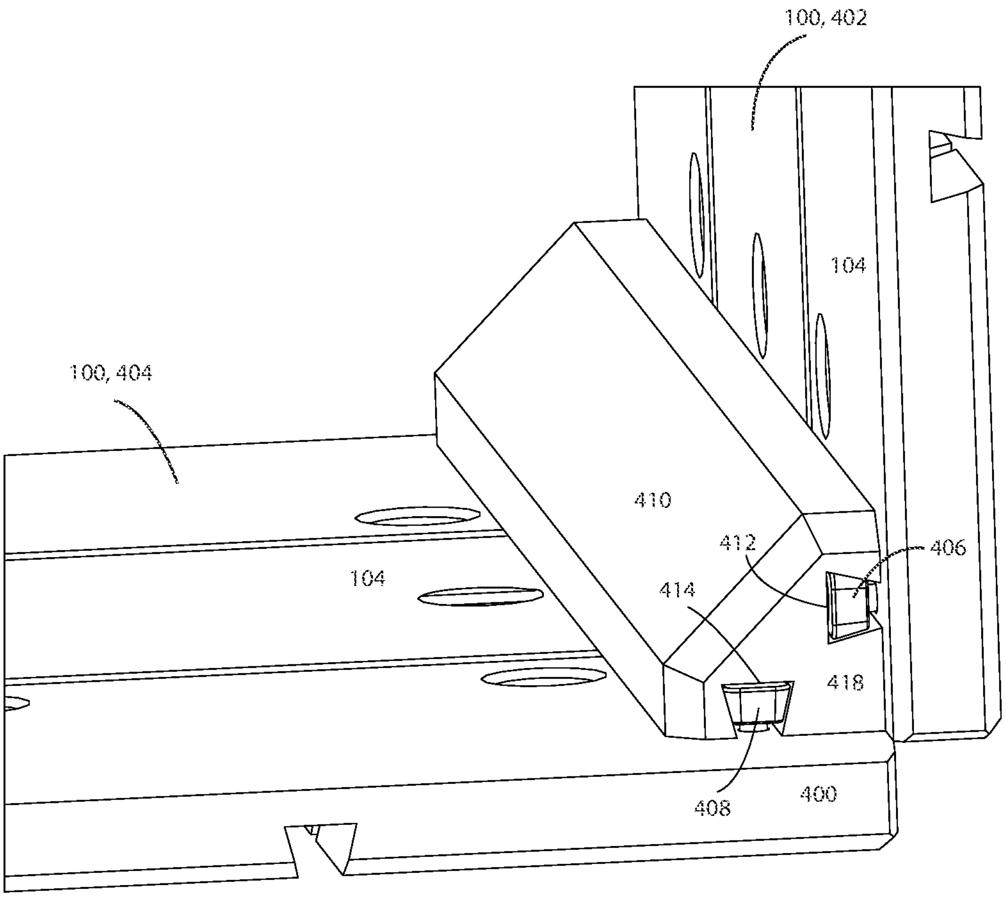
FIG. 5 shows the two panels of FIG. 4 assembled together.

FIG. 5 shows the connector assembly 400 securing the first panel 402 to the second panel 404. The first studs 406 are firmly seated in the first recess 412, and the second studs 408 are likewise firmly seated in the second recess 414. The first surface 420 (not visible) abuts and supports the bottom surface 104 of the first panel 402, while the second surface 422 (not visible) abuts and supports the bottom surface 104 of the second panel 404.

Figure 6:
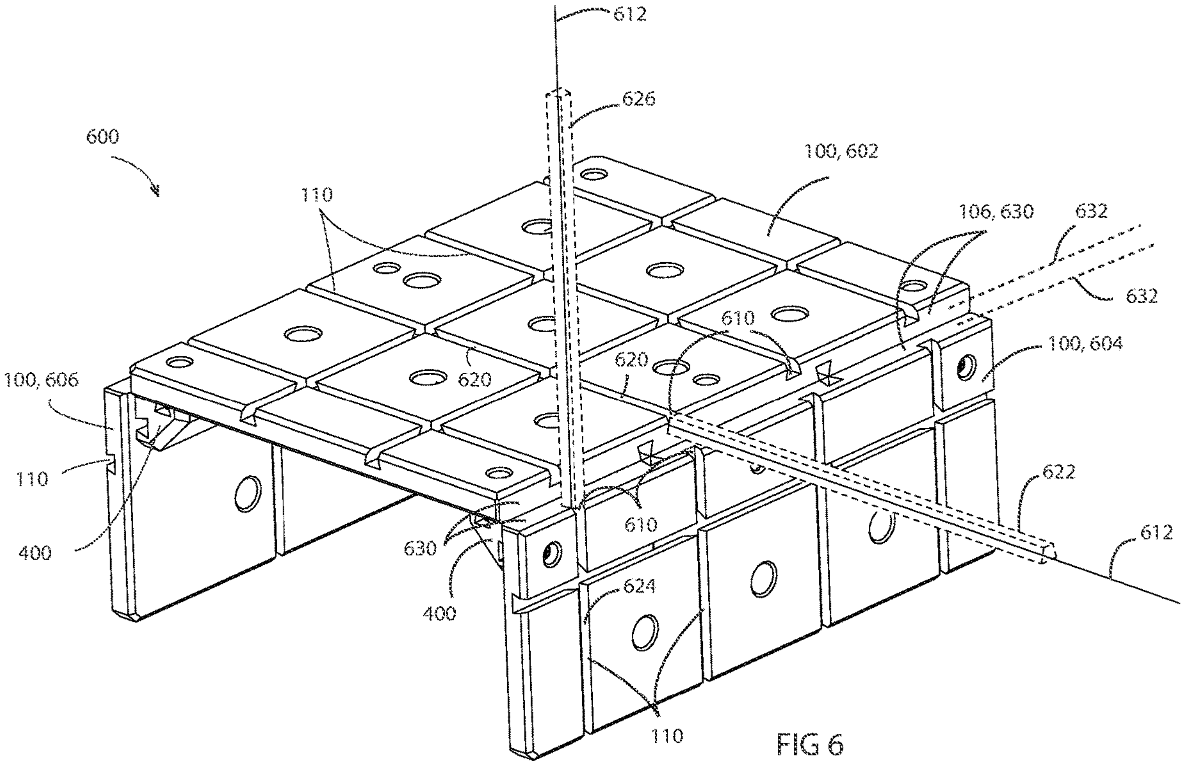
FIGS. 6-14 show example embodiments of an apparatus made using various panels secured together.

FIG. 6 shows an assembly 600 composed of three panels 100, including a first assembly panel 602, a second assembly panel 604, and a third assembly panel 606. In the example embodiment shown, the second assembly panel 604, and a third assembly panel 606 are smaller in size when compared to the first assembly panel 602. Alternately, they may be the same size, or larger than the first assembly panel 602. Similarly, the panels 602, 604, 606 may have the same shape or different shapes and each may or may not be planar.

The connector assembly is configured to secure the panels 602, 604, 606 to each other so that axial projections of the upper retaining slots 110 are not blocked by any other panels. As used herein, an axial projection of a retaining slot is an extension of the boundaries of the slot beyond an end 610 of the slot along a long axis 612 of the slot. For example, a top upper retaining slot 620 defines a top axial projection 622 horizontally along the first axis 612 of the top upper retaining slot 620. Similarly, a side upper retaining slot 624 defines a side axial projection 626 along the first axis 612 of the side upper retaining slot 624.

The top axial projection 622 of the first assembly panel 602 is unobstructed by the second assembly panel 604 that is adjacent thereto. This access to the side surface 106 of the first assembly panel 602 makes it possible to insert a MATCHFIT™ clamp into the first assembly panel 602. Likewise, the side axial projections 626 of the second assembly panel 604 is unobstructed by the first assembly panel 602 that is adjacent thereto. This access to the side surface 106 of the second assembly panel 604 makes it possible to insert a MATCHFIT™ clamp into the second assembly panel 604. Similarly, the first assembly panel 602 and the third assembly panel 606 enjoy a similar positional relationship that ensures the necessary access for installing the MATCHFIT™ clamps.

In order to position the panels 602, 604, 606 to each other so that axial projections of the upper retaining slots 110 are not blocked by any other panels, the connector assembly 400 orients straight side surfaces 630 so that respective long axes 632 of the straight side surfaces 630 are parallel to each other.

Figure 7:
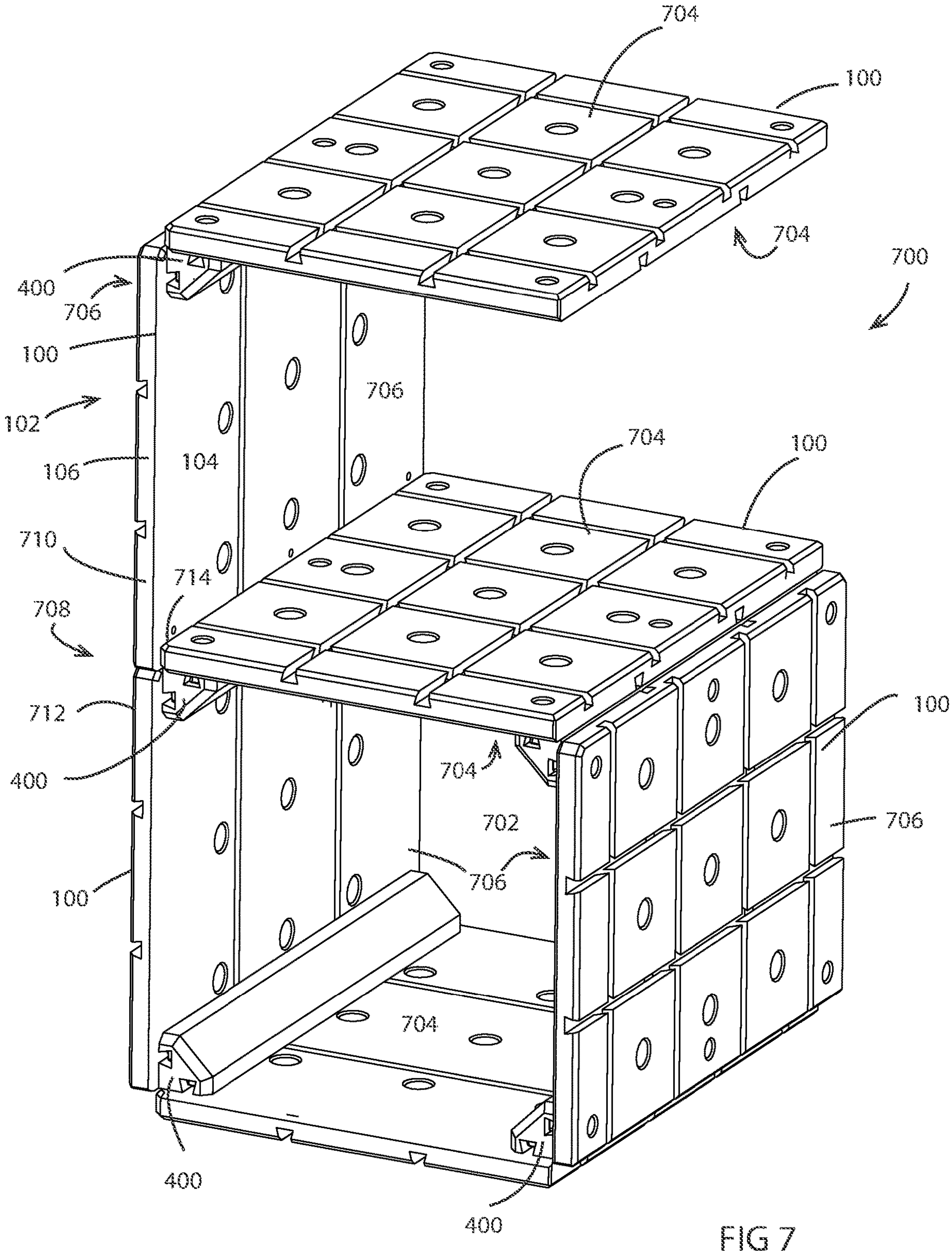

FIG. 7 shows another example embodiment of an assembly 700 made using plural panels 100 and plural connection assemblies 400. Such an assembly 700 may be, for example, assembled on a job site. A chamber 702 may be used for temporary storage, and multiple horizontal work surfaces 704 and multiple inclined work surfaces 706 may be used as needed. As used herein, inclined means any non-horizontal angle, including vertical. In an embodiment a side panel assembly 708 includes one panel 100 (not shown), or two panels 710, 712 connected using at least one MATCHFIT™ clamp and a connector piece on the top surface 102 of two panels 710, 712. Alternately, a connector assembly 400 (not shown) could be installed in corner 714.

Figure 8:
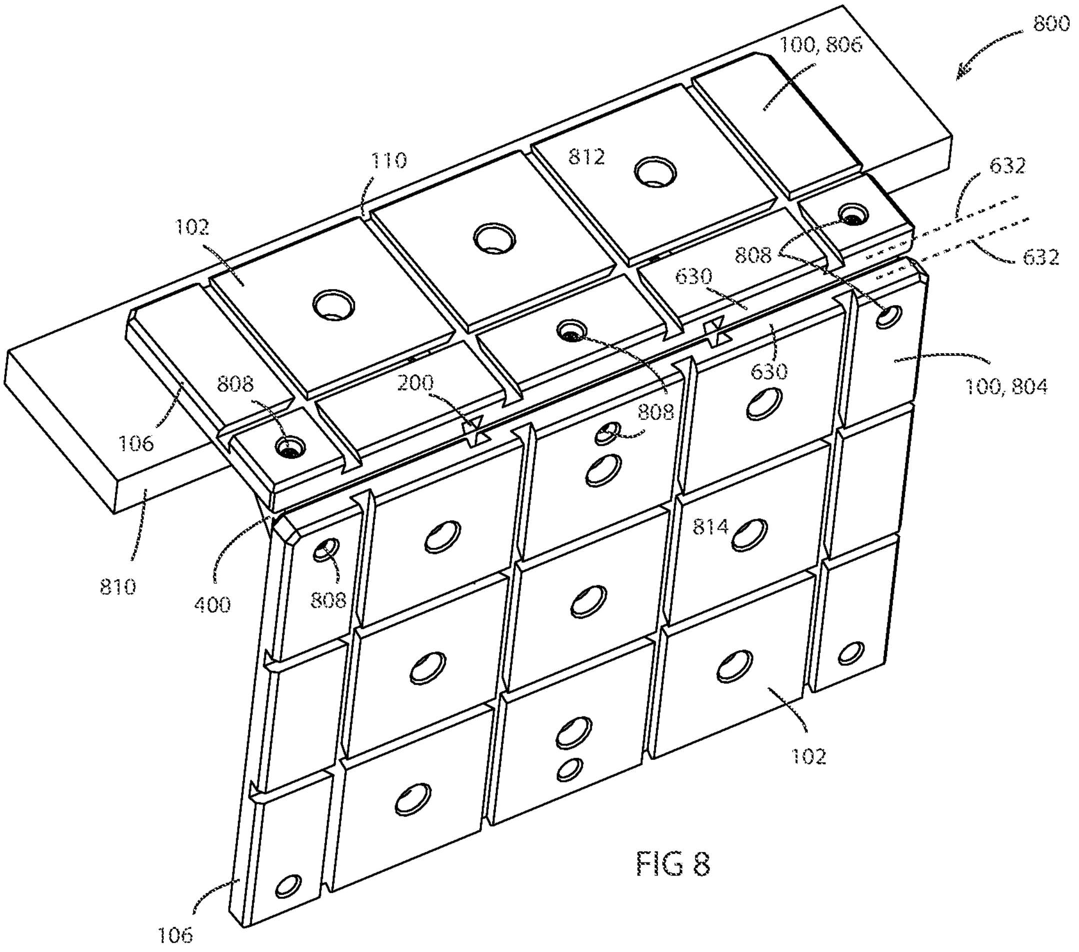

FIG. 8 shows yet another example embodiment of an assembly 800 composed of two panels 100, including a wide assembly panel 804 and a narrow assembly panel 806 secured together via a connector assembly 400. The top surfaces 102 are disposed at ninety (90) degrees to each other, and the respective long axes 632 of the straight side surfaces 630 are parallel to each other.

The connector assembly 400 is not visible, but bolts 808 that secure studs (not visible) to the panels 100 are visible. These bolts 808 may be tightened to more firmly seat the studs 406, 408 into the respective recesses 412, 414 of the intermediate component 410 (see FIG. 4).

The assembly 800 is secured to a table 810 and as such, the narrow assembly panel 806 of the assembly 800 may be used as a horizontal extension 812 of the table 810. In addition, the wide assembly panel 804 may be used as a vertical work surface 814 to which a workpiece may be clamped via the MATCHFIT™ clamps to leave an edge pointing up that may be, for example, planed by hand.

Figure 9:
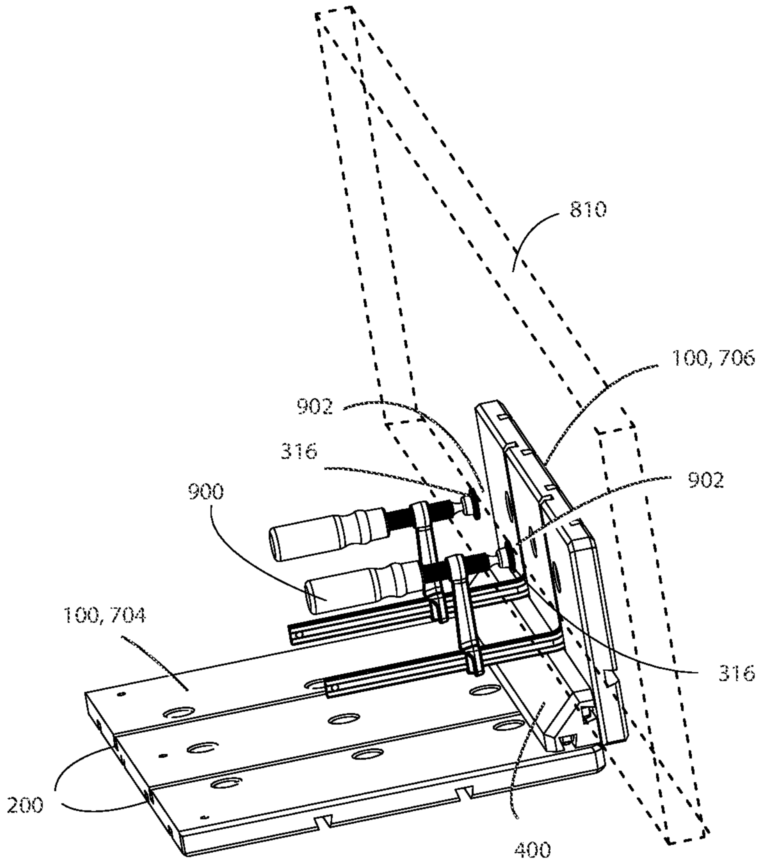

FIG. 9 shows a back of the assembly 800 of FIG. 8. The second post 312 (not visible) of each of two MATCHFIT™ clamps 900 has been installed in a respective bottom retaining slot 200 of the narrow assembly panel 806. A gap 902 is formed between the bottom surface 104 and the clamp head 316 of each of two MATCHFIT™ clamps 900. The table 810 is positioned in the gaps 902 and the clamp heads 316 of the MATCHFIT™ clamps 900 are then tightened onto the table 810, thereby securing the assembly 800 to the table 810.

Figure 10:
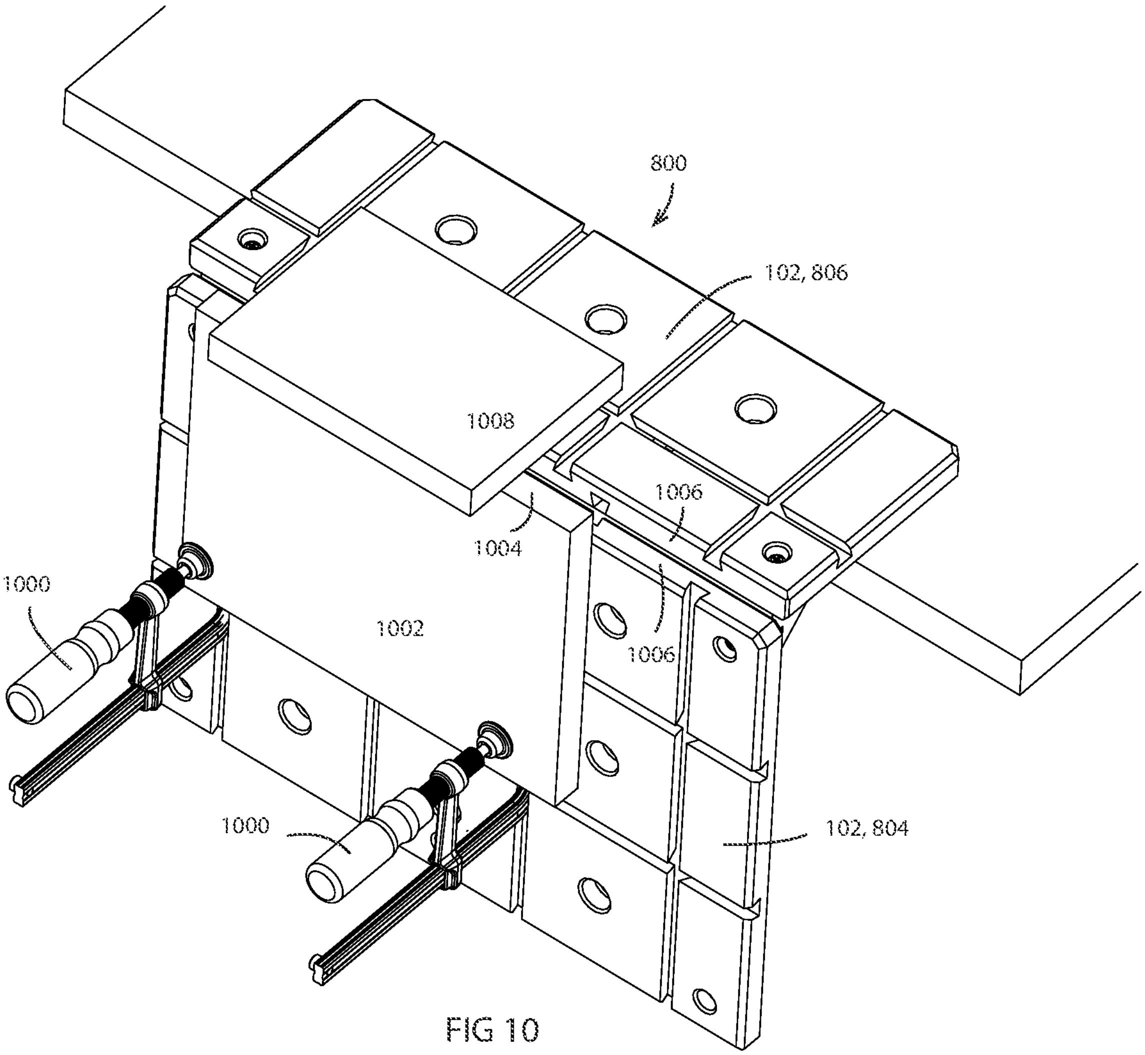

FIG. 10 shows the assembly 800 of FIG. 8 in use. Two additional MATCHFIT™ clamps 1000 are used to support a workpiece 1002 against the top surface 102 of the wide assembly panel 804. The workpiece 1002 is positioned such that a workpiece edge 1004 is flush with the top surface 102 of the narrow assembly panel 806 as evidences by a gauge 1008.

Figure 11:
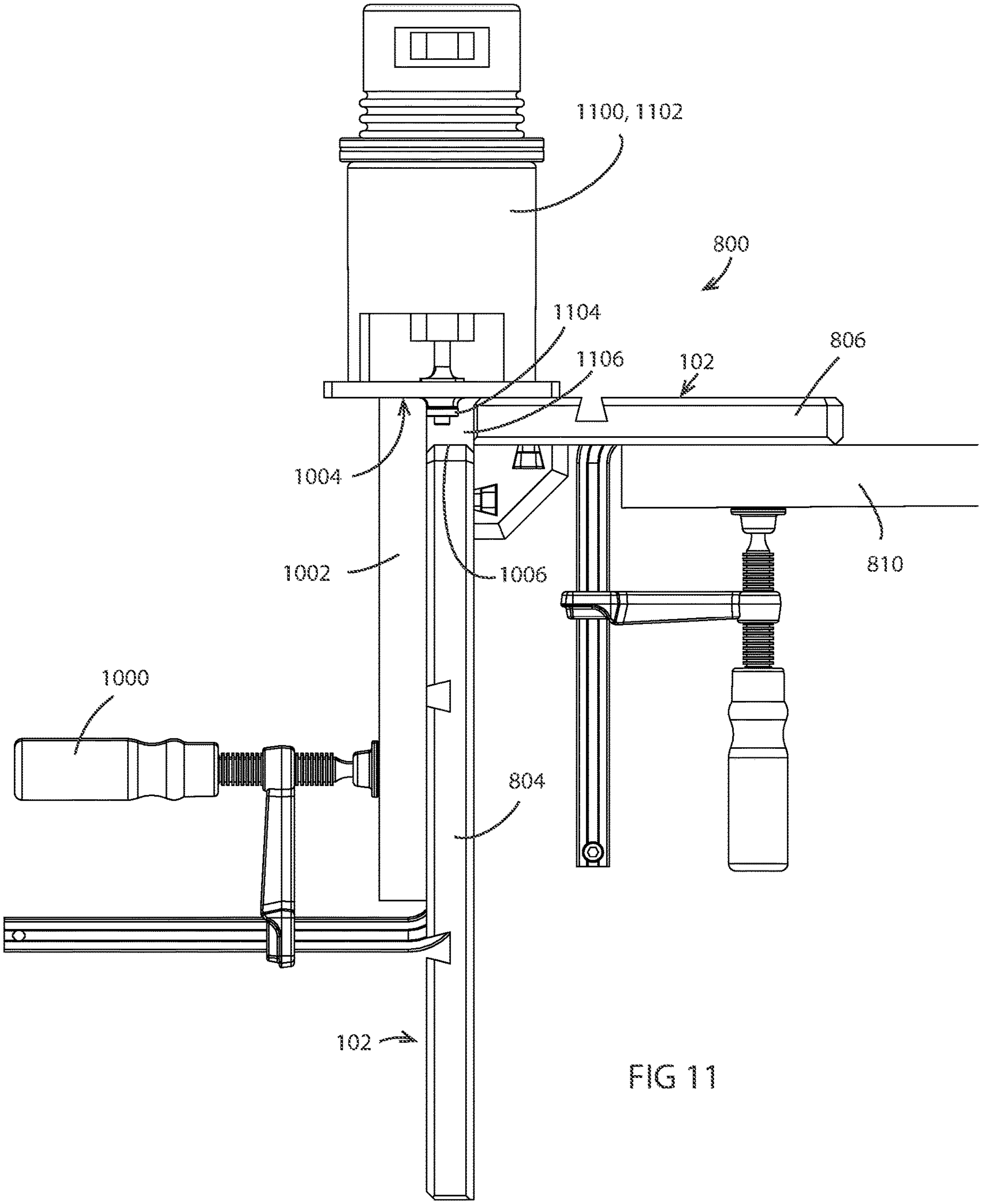

FIG. 11 shows the assembly 800 and workpiece 1002 of FIG. 10, with the gauge 1008 removed so that the workpiece edge 1004 is fully exposed. In this configuration the assembly 800 acts not only as an extension of the table 810, but also as a work surface suitable for use with a tool 1100. In the example embodiment show, the tool is a router 1102 and is supported in part by the top surface 102 of the narrow assembly panel 806 and in part by the workpiece edge 1004. A router bit 1104 is free to be positioned within a space 1106 between the narrow assembly panel 806 and the workpiece 1002. This enables an operator to work the workpiece 1002 with the router 1102, and to leave the router 1102 in place when not working the workpiece 1002.

Figure 12:
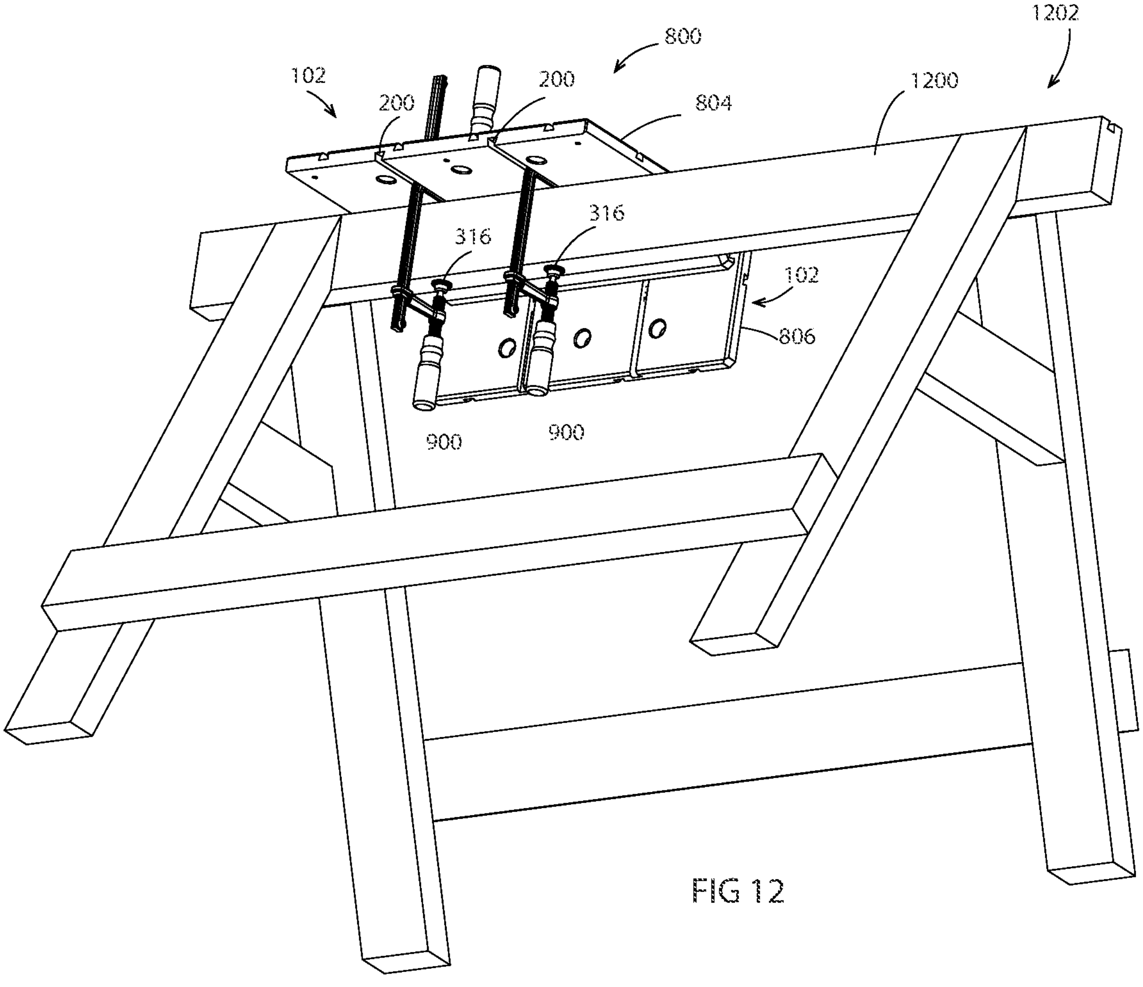

FIG. 12 shows the assembly 800 of FIG. 8 reoriented so that the top surface 102 (not visible) of the wide assembly panel 804 is horizontal and the top surface 102 (not visible) of the narrow assembly panel 806 is inclined. The second post 312 (not visible) of each of two MATCHFIT™ clamps 900 has been alternately installed in a respective bottom retaining slot 200 of the wide assembly panel 804. The clamp heads 316 of the MATCHFIT™ clamps 900 are then tightened onto a board 1200 (e.g. 2"×4") of a sawhorse 1202, thereby securing the assembly 800 to the sawhorse 1202 for job site work.

Figure 13:
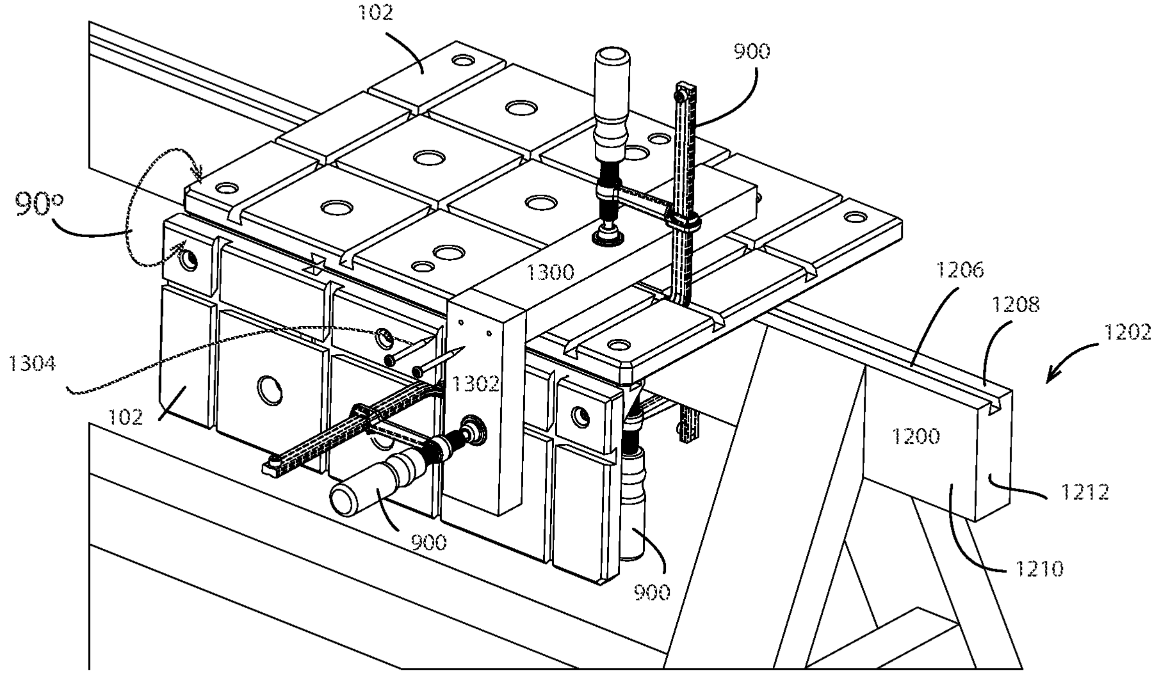

FIG. 13 shows the assembly 800 secured to the sawhorse 1202 of FIG. 12 from above. In an example application, the top surfaces 102 are suitably oriented to enable the joining of a first workpiece 1300 and a second workpiece 1302. The top surfaces may be secured to the assembly using one or more MATCHFIT™ clamps 900. Since the top surfaces 102 are disposed at ninety (90) degrees to each other, the workpieces will also be joined at ninety (90) degrees because the workpieces are positioned by the top surfaces 102. The joint may be secured in any number of ways known to those of ordinary skill in the art such as via fasteners such as screws, dowels, biscuits, and/or adhesive etc. In the example embodiment shown, the first workpiece 1300 and the second workpiece 1302 are joined using screws 1304.

The sawhorse 1202 may include a workhorse recess 1206 in a top surface 1208 as shown, a side surface 1210, and/or an end surface 1212 of the board 1200. In such an embodiment the second post 312 of one or more MATCHFIT™ clamps 900 may be used to secure the assembly 800 to the board 1200.

Figure 14:
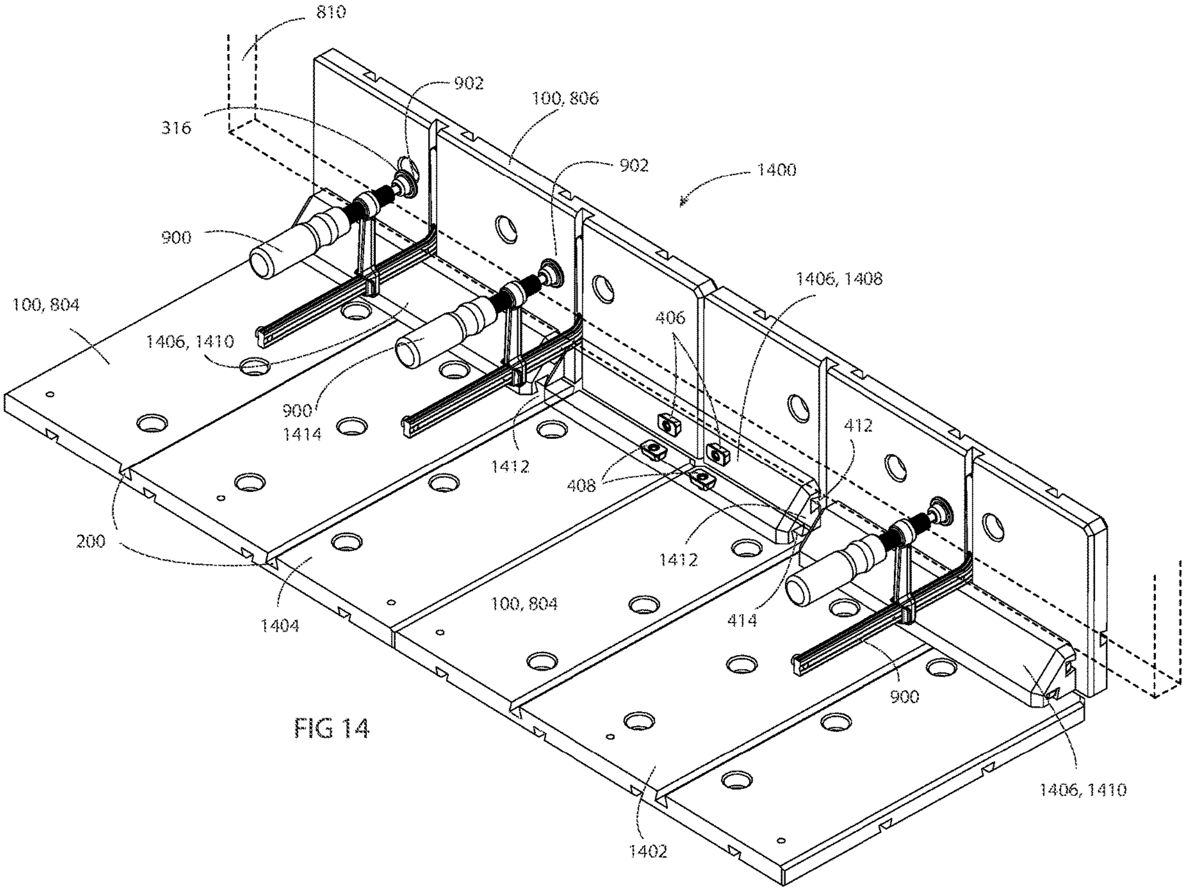

FIG. 14 shows another example embodiment of an assembly 1400 that uses two assemblies 1402, 1404, each similar to the assembly 800 of FIG. 8. However, in this example embodiment the connector assembly 400 is not used. Instead, plural shorter connector assemblies 1406 are used. In such an embodiment, each shorter connector assembly 1406 would receive at least one first stud 406 in a respective first recess 412, and would receive at least one second stud 408 in a respective second recess 414.

Shorter connector assemblies 1406 increase flexibility. For example, a shorter connector assembly 1408 may be used to span the two assemblies 1402, 1404 by receiving a first stud 406 from assembly 1402 and a first stud 406 from assembly 1404 in its first recess 412. Likewise, that shorter connector assembly 1408 would receive a second stud 408 from assembly 1402 and a second stud 408 from assembly 1404 in its second recess 414. The shorter connector assembly 1408 would thereby hold the two assemblies 1402, 1404 in position relative to each other.

Additional shorter connector assemblies 1410 may be used to secure the respective wide assembly panels 804 and narrow assembly panels 806 to each other. In addition, the plural shorter connector assemblies 1406 may be spaced apart from each other to form spaces 1412 therebetween. These spaces may be used to make room for a MATCHFIT™ clamp 1414. With this space 1412, the MATCHFIT™ clamp 1414 may be moved close to or put in contact with the bottom surface 104 of the wide assemble panel 804 of the assembly 1404.

Figure 15:
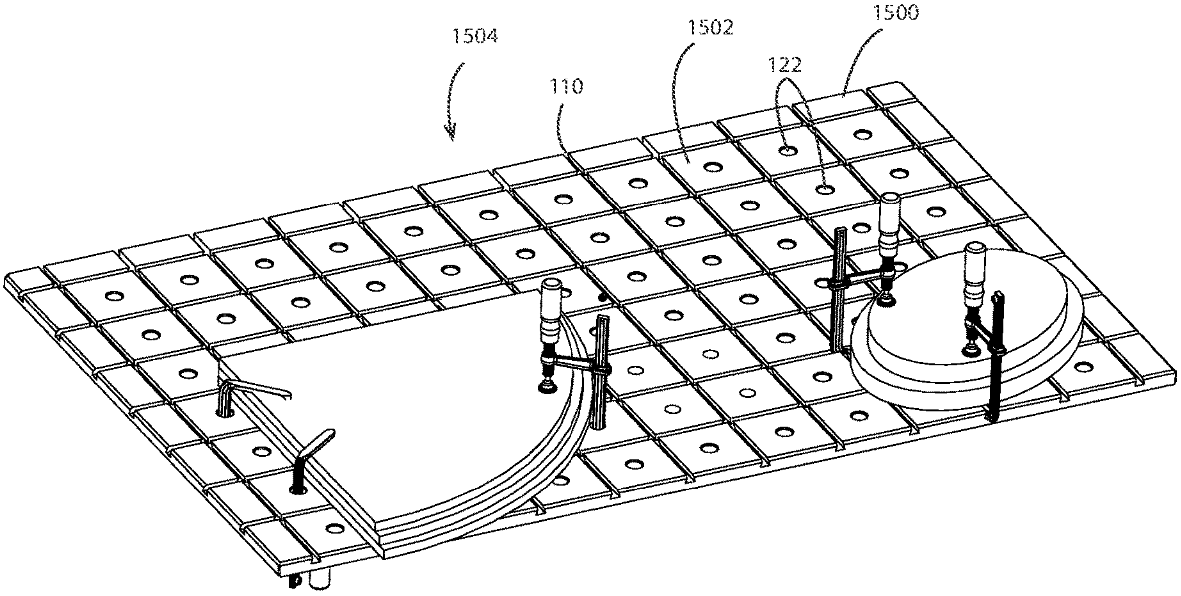
FIG. 15 shows an alternate example embodiment of the panel.

FIG. 15 shows an alternate embodiment of the panel 1500 that is relatively larger and which includes two dog holes 122 for each discrete top surface 1502. The panel 1500 may be of any size and shape. There may be any number of upper retaining slots 110, and they may or they may not be parallel or perpendicular to each other and they may or may not form a discernable pattern 1504. The shape of the upper retaining slots 110 may be uniform, or may vary from slot to slot or within a single slot in order to accommodate a range of tool types and sizes.

This example embodiment may be used as a work surface that is supported by other means, such as an underlying table or workhorse etc. When placed atop a table, the panel 1500 may optionally include spacers secured to the bottom of the panel 1500 to set the panel 1500 away from the table top. This will allow the use of a MATCHFIT™ clamp positioned in one of the dog holes 122. When the panel 1500 is used atop another table, the panel 1500 can be used as desired and then set aside as an assembly including the workpiece until it is time to be used again. Alternately, the panel 1500 may receive legs and act as the table top itself. As such, the panel 1500 can readily be set up as a work table at a job site.

Figure 16:
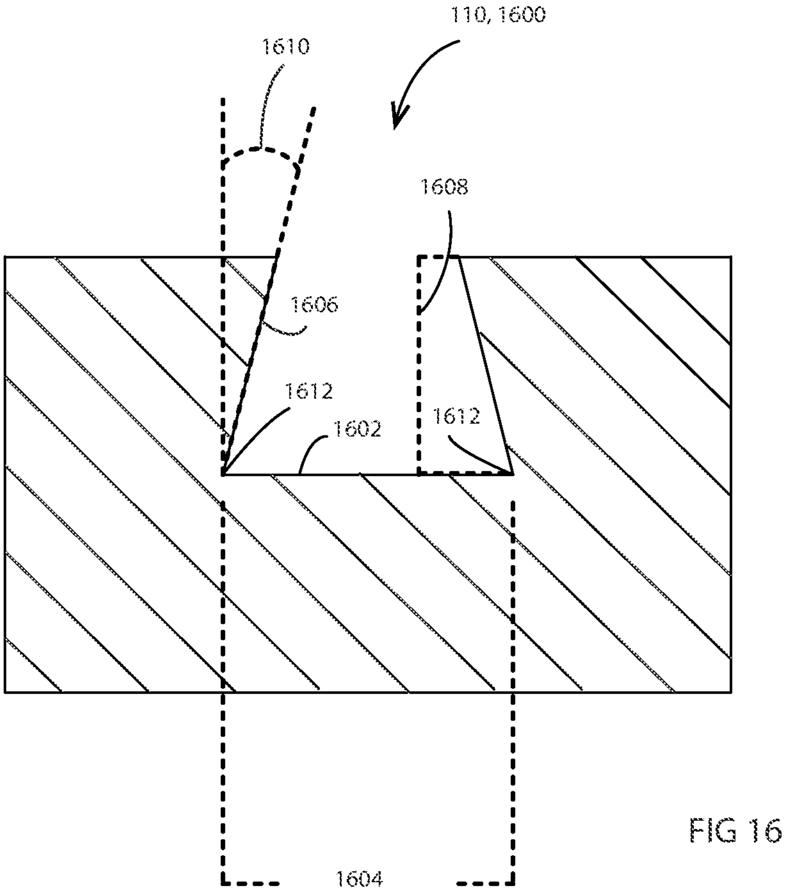
FIG. 16 shows a cross section of an example embodiment of a retaining slot having a dovetail shape.

FIG. 16 shows a cross section of an example embodiment of the retaining slots 110, 200 having a dovetail shape 1600. A base 1602 is characterized by a width 1604 of 0.5 inches. A sidewall 1606 is characterized by height 1608 of 0.375 inches and an angle 1610 of fourteen degrees (14°) inclined inward from outside edges 1612 of the base 1602. This configuration ensures a snug fit for the second post 312 of an example embodiment of the MATCHFIT™ clamp 302. The embodiment shown depicts a single set of dimensions and angles. However, different dimensions and angles may be used to form any number of dovetail shapes and sizes.

The present inventor has devised a unique, innovative, and versatile panel that can accommodate conventional dog clamps as well as the new MATCHFIT™ style of clamp. This presents a flexibility not previously present in such a panel. The retaining slots on both sides of the panel enable the panel to be used as a work surface by itself and as an extension of another work surface such as a table. In addition, because the panels are modular, plural panels can be joined together to form any number of assemblies that include work surfaces and storage areas. The modular nature enables these assemblies to be carried and assembled at remote locations. In addition, the simple construction of the panels makes it possible to create any desired panel configuration. This, in turn, enables panels of any size and shape, and assemblies of any size and shape. This represents an improvement in the art.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus, comprising:

a first panel comprising: a first panel top surface; a first panel bottom surface; a first panel side surface spanning the first panel top surface and the first panel bottom surface; and a first panel gridwork of dovetail shaped retaining slots recessed into the first panel top surface and opening through the first panel side surface;

a second panel comprising: a second panel top surface; a second panel bottom surface; a second panel side surface; a second panel gridwork of dovetail shaped retaining slots recessed into the second panel top surface and opening through the second panel side surface; and a corner bracket assembly configured to secure the first panel to the second panel in a fully open corner joint configuration, the corner bracket assembly comprising a corner bracket body; dovetail slots in the corner bracket body; a dovetail shaped fastener secured to the first panel bottom surface and configured to fit within a first dovetail slot of the dovetail slots in the corner bracket body to secure the first panel to the corner bracket body; and a dovetail shaped fastener secured to the second panel bottom surface and configured to fit within a second dovetail slot of the dovetail slots in the corner bracket surface and the second panel bottom surface to the corner bracket body.

2. The apparatus of claim 1, wherein the corner bracket assembly is configured to secure the first panel to the second panel such that the first panel top surface and the second panel top surface are disposed at ninety (90) degrees to each other.

3. The apparatus of claim 1, wherein the first dovetail slot and the second dovetail slot are disposed parallel to each other but at different clocking positions.

4. The apparatus of claim 1, wherein the first panel bottom surface and the second panel bottom surface define an inside corner, and wherein the corner bracket body extends less than a quarter of the way along the first panel from the inside corner and less than a quarter of the way along the second panel from the inside corner.

5. The apparatus of claim 1, wherein the corner bracket assembly further comprises a bolt for each dovetail shaped fastener, wherein the bolt is configured to secure the respective dovetail shaped fastener to a respective panel by passing through the respective panel and drawing the dovetail shaped fastener toward the respective panel, and wherein drawing the dovetail shaped fastener toward the respective panel tightens a connection between the respective panel and the corner bracket body.

6. An apparatus, comprising:

a first panel comprising: a first panel top surface; a first panel bottom surface; a first panel side surface spanning the first panel top surface and the first panel bottom surface; and a first panel gridwork of dovetail shaped retaining slots recessed into the first panel top surface; wherein each first retaining slot of the first panel gridwork of dovetail shaped retaining slots comprises an opening through at least one location in the first panel side surface;

a second panel comprising: a second panel top surface; a second panel bottom surface; a second panel side surface; a second panel gridwork of dovetail shaped retaining slots recessed into the second panel top surface; wherein each second retaining slot of the second panel gridwork of dovetail shaped retaining slots comprises an opening through at least one location in the second panel side surface; and a corner bracket assembly configured to secure the first panel to the second panel in a fully open corner joint configuration;

wherein the corner bracket assembly is disposed in an inside corner formed by the first panel and the second panel, and wherein the corner bracket assembly extends less than halfway along the first panel from the inside corner and less than halfway along the second panel from the inside corner.

7. The apparatus of claim 6, wherein the corner bracket assembly extends less than a quarter of the way along the first panel from the inside corner and less than a quarter of the way along the second panel from the inside corner.

8. The apparatus of claim 6, wherein the corner bracket assembly is configured to secure the first panel to the second panel such that the first panel top surface and the second panel top surface are disposed at ninety (90) degrees to each other.

9. The apparatus of claim 6, wherein the corner bracket assembly comprises a first corner bracket slot comprising a dovetail shape and a second corner bracket slot comprising the dovetail shape and oriented parallel to the first corner bracket slot, wherein the first corner bracket slot is at a first clocking position that is different from a second clocking position of the second corner bracket slot.

10. The apparatus of claim 9, wherein the first clocking position and the second clocking position are ninety (90) degrees apart.

11. The apparatus of claim 9, wherein the corner bracket assembly comprises a corner bracket body comprising the first corner bracket slot and the second corner bracket slot, and wherein the corner bracket assembly comprises a dovetail shaped fastener releasably secured to the first panel bottom surface and configured to fit within the first corner bracket slot to secure the to the second panel bottom surface and configured to fit within the second corner bracket slot to secure the second panel to the corner bracket body.

12. An apparatus, comprising:

a first panel comprising: a first panel top surface; a first panel bottom surface; a first panel side surface; and a first panel gridwork of dovetail shaped retaining slots recessed into the first panel top surface and opening through the first panel side surface;

a second panel comprising: a second panel top surface; a second panel bottom surface; a second panel side surface; a second panel gridwork of dovetail shaped retaining slots recessed into the second panel top surface and opening through the second panel side surface; and a corner bracket assembly configured to secure the first panel to the second panel in a fully open corner joint configuration, the corner bracket assembly comprising:

a corner bracket body comprising a first corner bracket slot comprising a dovetail shape and a second corner bracket slot comprising the dovetail shape and oriented parallel to the first corner bracket slot, wherein the first corner bracket slot is disposed at a first clocking position and the second corner bracket slot is disposed at a second clocking position that is different from the first clocking position; and a discrete dovetail shaped fastener secured to the first panel bottom surface and configured to fit within the first corner bracket slot to secure the first panel to the corner bracket body; and a discrete dovetail shaped fastener secured to the second panel bottom surface and configured to fit within the second corner bracket slot to secure the second panel to the corner bracket body.

13. The apparatus of claim 12, wherein a difference between a clocking position of the first corner bracket slot and a clocking position of the second corner bracket slot is 90 degrees.

14. The apparatus of claim 12, wherein the corner bracket assembly is configured to secure the first panel to the second panel such that the first panel top surface and the second panel top surface are disposed at ninety (90) degrees to each other.

15. The apparatus of claim 12, wherein the corner bracket assembly is disposed in an inside corner formed by the first panel and the second panel, and wherein the corner bracket assembly extends less than halfway along the first panel from the inside corner and less than halfway along the second panel from the inside corner.

16. The apparatus of claim 15, wherein the corner bracket assembly extends less than a quarter of the way along the first panel from the inside corner and less than a quarter of the way along the second panel from the inside corner.

* * * * *